(12) United States Patent
Yarnold

(10) Patent No.: US 6,289,905 B1
(45) Date of Patent: Sep. 18, 2001

(54) ENGINE CLEANING

(76) Inventor: Dennis Roy Yarnold, Pen-y-Wern, Pentrebach Pontardulais, SA4 1QG Swansea (GB)

(*) Notice: Subject to any disclaimer, the term of this patent is extended or adjusted under 35 U.S.C. 154(b) by 0 days.

(21) Appl. No.: 09/240,479

(22) Filed: Jan. 29, 1999

(30) Foreign Application Priority Data

Feb. 3, 1998 (GB) .................................................. 9802169

(51) Int. Cl.$^7$ .................................................. B08B 3/02
(52) U.S. Cl. ................. 134/111; 134/166 R; 134/169 A; 134/183
(58) Field of Search ............................ 134/166 R, 167 R, 134/168 C, 167 C, 169 C, 166 C, 169 R, 169 A, 111, 200, 183

(56) References Cited

U.S. PATENT DOCUMENTS

| | | | |
|---|---|---|---|
| 1,552,998 | * 9/1925 | Menge | 134/168 R |
| 1,820,552 | * 8/1931 | Wooley | 134/167 R |
| 1,951,649 | * 3/1934 | Delano | 134/167 R |
| 2,029,781 | * 2/1936 | McLean | 134/168 R |
| 2,243,446 | * 5/1941 | Terlesky et al. | 134/167 R |
| 2,249,303 | * 7/1941 | Smith | 134/168 R |
| 2,312,091 | * 2/1943 | Gray | 134/168 R |
| 2,432,290 | * 12/1947 | Davis | 134/167 R |
| 2,554,389 | * 5/1951 | Stevens | 134/167 R |
| 2,573,008 | * 10/1951 | Gorden | 134/111 |
| 2,653,116 | * 9/1953 | Whitcomb et al. | 134/169 R |
| 2,733,723 | * 2/1956 | Whitcomb | 134/168 R |
| 3,054,411 | * 9/1962 | Randall | 134/111 |
| 3,308,840 | * 3/1967 | Kelly | 134/167 R |
| 3,431,145 | * 3/1969 | Riley | 134/166 R |
| 3,536,081 | * 10/1970 | Riess | 134/168 C |
| 3,777,707 | * 12/1973 | Tabone . | |
| 4,052,227 | * 10/1977 | Delo et al. | 134/111 |
| 4,082,391 | * 4/1978 | Turner . | |
| 4,637,413 | * 1/1987 | Llewellyn et al. | 134/111 |
| 5,052,422 | * 10/1991 | Franz et al. | 134/169 R |
| 5,232,299 | 8/1993 | Hiss | 401/143 |
| 5,277,208 | 1/1994 | Mansur | 134/56 R |
| 5,398,708 | 3/1995 | Sheldon | 134/86 |
| 5,526,539 | * 6/1996 | Bower et al. . | |
| 5,816,272 | * 10/1998 | Leaphart | 134/169 A |
| 5,915,438 | * 6/1999 | Winters et al. . | |

FOREIGN PATENT DOCUMENTS

80777 * 6/1934 (SE) .................................................. 134/169 A

* cited by examiner

Primary Examiner—Frankie L. Stinson
(74) Attorney, Agent, or Firm—David P Gordon; David S Jacobson; Thomas A Gallagher

(57) ABSTRACT

A reservoir for re-usable cleaning fluid and filter for filtering fluid draining into the reservoir are positioned below an engine or supported engine component positioned at a cleaning zone. Cleaning fluid is delivered to the cleaning zone from the cleaning fluid held in the reservoir and the delivered cleaning fluid then drains into the reservoir (via the filter) from the cleaning zone above the reservoir. The cleaning fluid is re-circulated and filtered for continuous use.

24 Claims, 2 Drawing Sheets

ENGINE CLEANING

FIELD OF THE INVENTION

The present invention relates to an apparatus and method for cleaning an engine or engine components, in particular a vehicle engine or engine components.

BACKGROUND OF THE INVENTION

The cleaning of engines and/or engine components normally takes place in an outdoor environment or in a garage premises or forecourt and is often a hazardous operation. Most cleaning procedures simply involve pouring or splashing copious quantities of cleaning fluid on to the engine and allowing the dirty fluid to drain onto the ground. Vehicle engine cleaning fluids normally contain toxic substances which makes this process especially hazardous. Such a process can also be expensive, especially when several vehicle engines are cleaned and due to the high wastage of cleaning fluid.

It is therefore the purpose of the present invention to reduce the aforementioned problems and provide a safe, efficient and cost-effective way in which to clean vehicle engines and/or engine components.

SUMMARY OF THE INVENTION

According to a first aspect, the invention provides an apparatus for cleaning an engine or engine components, the apparatus comprising:

i) a reservoir for re-usable cleaning fluid;

ii) filter means arranged to filter cleaning fluid draining into the reservoir from a cleaning zone orientated over the filter means; and, iii) fluid delivery means arranged to deliver cleaning fluid to the cleaning zone, the fluid delivery means including a fluid line extending from the reservoir.

The reservoir and filter means are preferably shaped and dimensioned to fit below an engine of a vehicle and, in particular, an automobile engine in situ in the engine compartment.

The filter means is preferably orientated to filter fluid draining into the reservoir, under gravity, from the cleaning zone, which cleaning zone is preferably directly above the filter means and also preferably the reservoir. The filter means may be received within the reservoir (above the level of the fluid) or supported above the reservoir. The filter means may be permanently fixed to the reservoir or, more preferably, may be removable (for example for cleaning purposes).

The filter means is adapted to filter out any dirt and/or contaminants from the cleaning fluid draining into the reservoir such that the cleaning fluid collecting in the reservoir is substantially "clean". Typically the filter means comprises a filter element which is preferably substantially planar. Desirably the filter means is replaceable and/or cleanable subsequent to use. Support means may be provided for supporting the filter element in position. The support means may, for example, be a reticulated mesh element spanning the reservoir.

The filter element may comprise, for example, a paper or a foam filter or may simply comprise a reticulated or mesh element. The filter element collects dirt and/or contaminants draining from the cleaning zone.

The area of the engine or engine components treated by the cleaning fluid is referred to as the "cleaning zone". The flexible fluid line of the fluid delivery means preferably leads to a spray head such as a spray gun or nozzle. The flexible line is arranged to carry "clean" or filtered cleaning fluid to the spray head which is preferably manipulatable to provide controlled delivery of the cleaning fluid to the engine or engine components at the cleaning zone. The volume of fluid provided in the reserovir is preferably such that as the cleaning fluid drains into the reservoir, the spray gun may be operated continuously to deliver a desired amount of fluid.

Preferably the spray gun is linked to air compression means by a flexible tube so that, advantageously, a pressurized spray of fluid may be delivered. In an alternative embodiment, the fluid delivery means may comprise a pump which can pump the cleaning fluid through the spray head. Preferably, the pump is electronically controlled and/or flame retardant.

The apparatus preferably comprises closure means to close the reservoir (and also preferably the filter means) when the apparatus is not in use, for safety reasons. Preferably the closure means comprises one or more leaves movable from an access position in which fluid may drain into the reservoir, to a closed position substantially covering the reservoir. Preferably the or each leaf comprising the closure means is arranged to slide to the closed position from the access position, preferably under the influence of biasing means, such as for example, a respective spring.

The or each leaf may function as a respective fluid drip tray which is orientated in the access position to direct the flow of fluid draining into the reservoir. The leaves are preferably arranged to adopt a flattened configuration covering the reservoir when orientated in the closed position; in the access position the leaf or leaves preferably adopt a tilted configuration.

Separation means is preferably provided to hold the or each leaf in the access position when the apparatus is in use. The separation means may preferably comprise fusible elements (typically elements arranged to melt upon heating, thereby permitting the leaf or leaves to be biased to the closed position).

The fusible elements may comprise lead or plastics pins engageable with a receiving formation or formations having at least one hole, the separation means preferably being adapted to abut and hold the leaf or leaves in the access position. The receiving formation or formations may comprise a plurality of holes such that, advantageously, the leaf or leaves can be mechanically adjusted to varied access positions.

The apparatus is adaptable to collect cleaning fluid from a vehicle engine of different sizes. In the event of the cleaning fluid catching fire, the lead or plastics pins melt such that the separation means is disengaged and the fluid drip trays are biased to the closed position. The fire can therefore be starved of oxygen and extinguished almost immediately.

Preferably, the apparatus is mobile allowing it to be easily transported. In one embodiment the apparatus may comprise a movable handle adapted to steer the apparatus in a desired direction. Alternatively, the apparatus may comprise a fixed handle having a storage tray.

In a further embodiment of the apparatus, the reservoir may be arranged to be positioned below a structure for supporting engine components, so that in such a configuration the apparatus may be used to clean engine components. Typically, the structure comprises a drain through tray supported on a set of legs. Preferably, the reservoir has socket means which are fixed on to or releasable from the reservoir, in which the socket means are engageable with the set of legs of the structure. In this arrangement the tray is held directly above the reservoir. Engine components may be placed in the tray and washed with cleaning fluid, the fluid draining into the reservoir from the tray, typically through perforations or the like in the base of the tray. Advantageously, one or more components may be placed in the tray and washed at the same time.

According to a second aspect, the invention provides an apparatus for cleaning an engine or engine components, the apparatus comprising:

i) a reservoir for re-usable cleaning fluid;

ii) filter means arranged to filter cleaning fluid draining into the reservoir from a cleaning zone orientated over the filter means; and iii) closure means movable from an access position, in which fluid may drain into the reservoir, to a closed position substantially covering the reservoir.

Desirably, the closure means is in accordance with the preferred features described above.

It is preferred that fluid delivery means is arranged to deliver cleaning fluid to the cleaning zone, the fluid delivery means including a fluid line extending from the reservoir.

According to a third aspect, the invention provides a method of cleaning an engine or engine components, the method comprising:

i) providing a reservoir for re-usable cleaning fluid and filter means for filtering fluid draining into the reservoir;

ii) arranging the reservoir and filter means below an engine or supported engine component;

iii) delivering the cleaning fluid to the cleaning zone from the cleaning fluid held in the reservoir; and, iv) filtering the cleaning fluid draining into the reservoir from a cleaning zone above the reservoir.

When delivering the cleaning fluid to the engine (or supported component), the fluid washes the engine (or component) and removes any dirt and/or contaminants. Thus, the fluid collecting in the reservoir is "clean" and may be re-used to further clean the same and/or different engine or engine components.

The invention will now be further described in a specific embodiment by way of example only and with reference to the accompanying drawings.

DETAILED DESCRIPTION OF THE PREFERRED EMBODIMENTS

Figure 1:
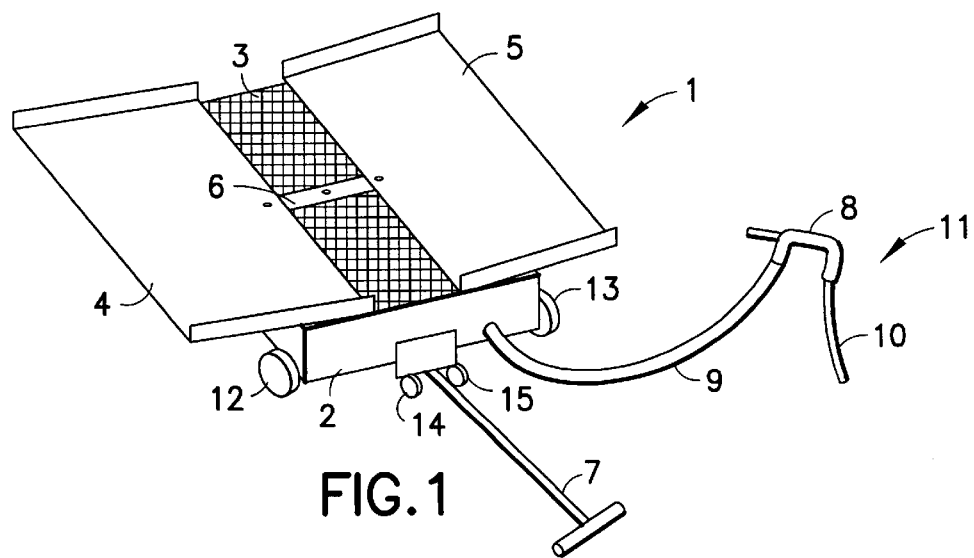
FIG. 1 is a schematic view of the apparatus according to the invention for use in performing the method according to the invention.

Referring to FIG. 1, there is illustrated an apparatus for cleaning an engine or engine components generally designated by the reference numeral 1. The apparatus 1 comprises a reservoir 2 for holding a re-usable cleaning fluid and a filter 3 to filter out dirt and/or contaminants from the cleaning fluid draining into the reservoir 2. The reservoir 2 is provided with a closure arrangement in the form of a pair of fluid drip trays 4,5. Each fluid drip tray 4,5 is resiliently biased to a closed, flattened position by respective springs 18,19 (shown most clearly in FIG. 3). The fluid drip trays 4,5 are maintained in a closed position when the apparatus 1 is stored and not in use, for safety reasons. The fluid drip trays 4,5 are kept apart in an open (access) position when the apparatus 1 is in use by a separation arrangement 6 which is further described below in relation to FIG. 3.

Fluid delivery means generally designated by reference numeral 11 comprises a spray gun 8 linked to the reservoir 2 by means of a flexible fluid line 9. The flexible fluid line 9 carries cleaning fluid from the reservoir 2 to the spray gun 8 which is triggered to deliver a quantity of cleaning fluid to the engine, or component. The spray gun 8 may be triggered several times in order to deliver a large amount of fluid. The spray gun 8 is also linked to air compression means, which causes the spray gun 8 to release a pressurised spray of fluid or to an electronically controlled pump (not shown), which pumps the fluid through the spray gun 8, by means of a flexible tube 10. The apparatus 1 also has a movable handle 7 with wheels 14,15 at one end of the reservoir 2 to steer the apparatus. The apparatus 1 also has wheels 12,13 attached to the reservoir 2 to easily transport the apparatus (the rear wheels are not shown).

Figure 2:
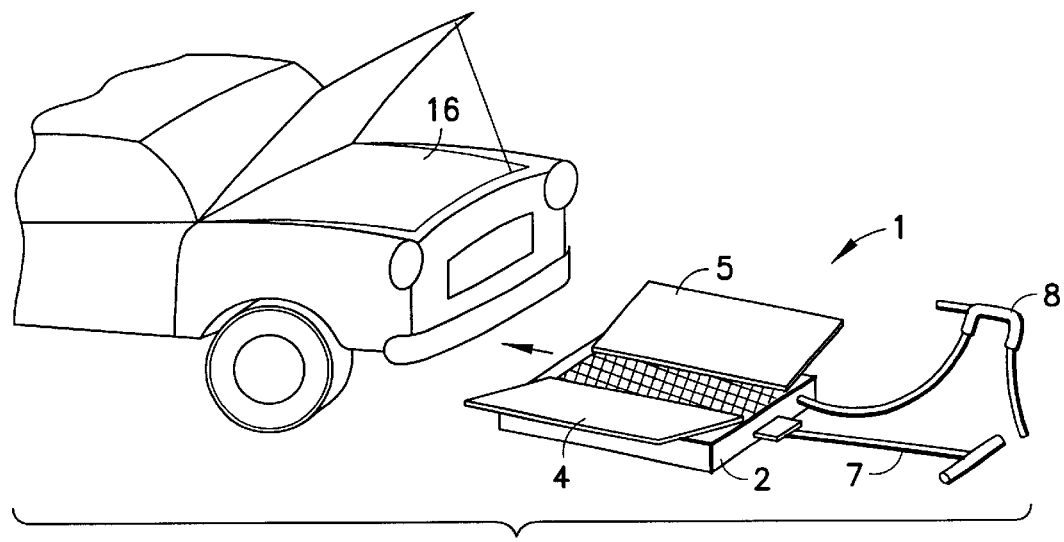
FIG. 2 is a schematic view of the apparatus according to the invention and an automobile under which the apparatus is placed.

Referring to FIG. 2, there is illustrated apparatus 1 which when used to clean an automobile engine 16 according to the method of the invention, the reservoir 2 is positioned under the engine 16 by means of the movable handle 7. The fluid drip trays 4,5 of the reservoir 2 are held in an open (access) position and can be manually adjusted inwardly and outwardly to varied access positions to accommodate for varying sizes of automobile engines.

A volume of cleaning fluid is poured into the reservoir 2 prior to positioning the reservoir 2 under engine 16. The spray gun 8 is then triggered to deliver cleaning fluid to the engine 16. The cleaning fluid washes the engine 16 and removes any dirt and/or contaminants. The cleaning fluid draining back into the reservoir 2 is filtered to remove the dirt and/or contaminants, so that the fluid collecting in the reservoir 2 may be re-used. The spray gun 8 is triggered again to feed fluid (by suction) from the reservoir 2 to the gun 8 so that more fluid may be delivered to the engine 16. The spray gun 8 may be operated continuously until the engine 16 is thoroughly washed.

Figure 3:
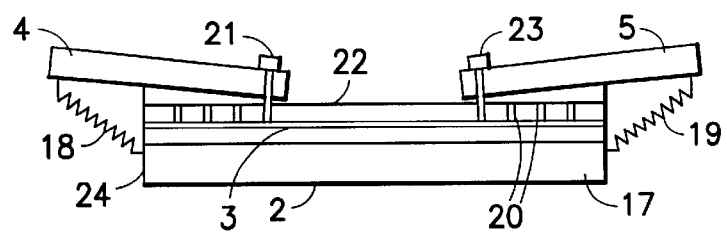
FIG. 3 is a schematic end-on view of the reservoir according to the apparatus of the invention.

Referring to FIG. 3, there is illustrated reservoir 2 holding a quantity of cleaning fluid 17. The reservoir 2 comprises a filter 3 positioned above the cleaning fluid 17, and fluid drip trays 4,5 which are held in an open access position. The filter 3 is permanently fixed to the reservoir 2 or may be removable for cleaning purposes. The fluid drip trays 4,5 are normally biassed to a closed position by spring coils 18,19, each of the spring coils 18,19 being connected to a free end of each tray 4,5 and the reservoir wall 24. The trays 4,5 are held in an open position through which cleaning fluid drains into the reservoir 2 by a separation arrangement which comprises a socket member 22 having a plurality of holes 20 and connecting pins 21,23 engageable with the holes 20. When pins 21,23 are engaged in the specified holes 20, the trays 4,5 are held in a fixed, tilted configuration. The trays 4,5 can be opened further by inserting pins 21,23 into holes 20 closer to the reservoir wall 24.

The connecting pins 21,23 may be lead or plastics pins which melt when there is a build-up of heat, such that, in a situation where the cleaning fluid in the reservoir 2 catches fire, the pins 21,23 melt and cause automatic closure of the trays 4,5 by the spring coils 18,19. The cover trays 4,5 are guided to the closed position by means of inclined guide slots on the internal end walls of the reservoir.

Figure 4:
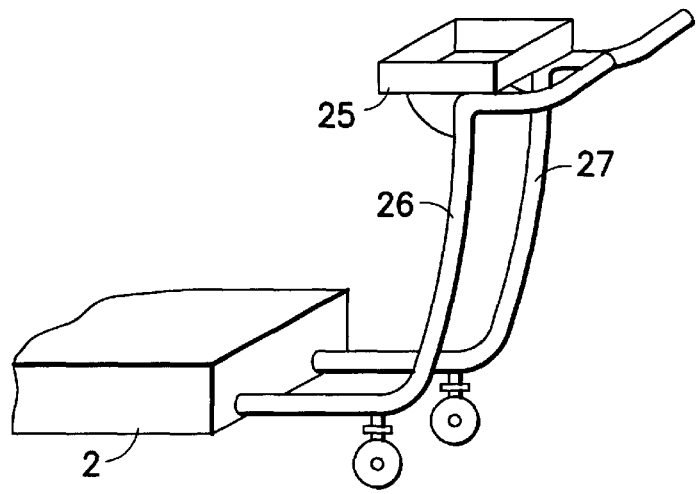
FIG. 4 is a schematic representation of an alternative embodiment of the handle means of the apparatus according to the invention.

Referring to FIG. 4, there is illustrated an alternative embodiment of the apparatus, in which the reservoir 2 is connected to a handle arrangement which comprises extended arms 26,27. A storage tray 25 can be placed on top of arms 26,27 for holding the spray gun 8 when not in use or various other implements.

Figure 5:
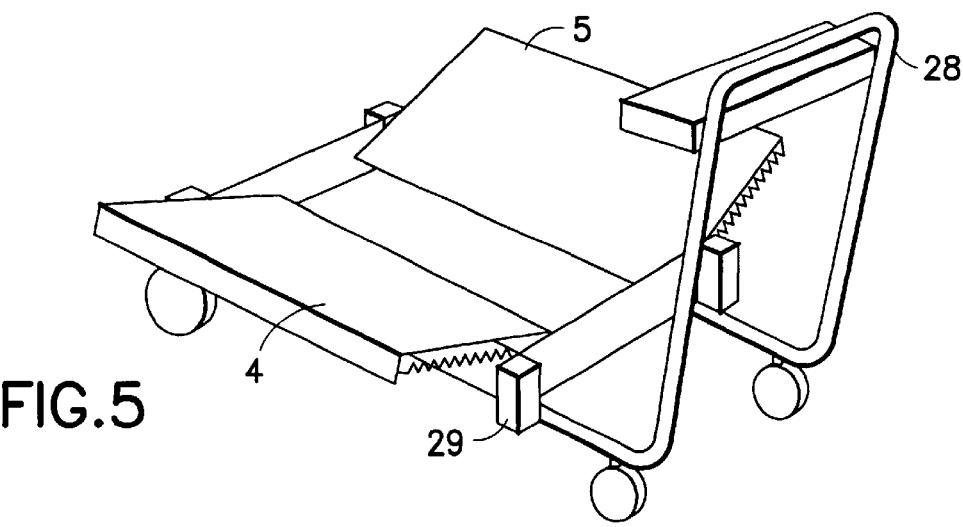
FIG. 5 is a schematic representation of a further embodiment of the apparatus according to the invention; and, FIG. 6 is a schematic view of the reservoir in an elevated position according to the apparatus of the invention.
Figure 6:
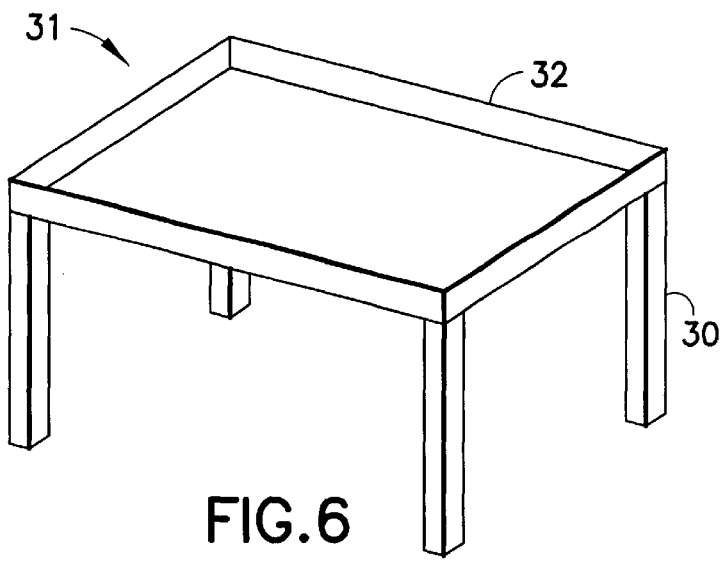

Referring to FIGS. 5 and 6, there is illustrated a further embodiment of the apparatus in which the reservoir 2 comprises fixed or releasable socket means 29 which is engageable with legs 30 of structure 31 (shown in FIG. 6). The apparatus also includes a modified handle arrangement 28. As shown in FIG. 6, the structure 31 comprises a tray 32 having perforations supported on a set of legs 30. The legs 30 engage with the socket means 29 of the reservoir 2 so that the tray 32 is positioned directly above the reservoir 2. In this configuration, the apparatus may be used to clean engine components. An engine component is placed in tray 32 and washed with cleaning fluid from the fluid delivery means 11. The cleaning fluid then drains into reservoir 2 to be filtered for re-use. One or more engine components may be placed in tray 32 and washed at the same time.

I claim:

1. Apparatus for cleaning an engine or engine component, the apparatus comprising:
   (i) a reservoir for re-usable cleaning fluid;
   (ii) a filter supported over the reservoir and arranged to filter cleaning fluid draining into the reservoir;
   (iii) a cleaning fluid delivery line extending from the reservoir and arranged to deliver cleaning fluid to a cleaning zone above the filter; and
   (iv) a closure arrangement comprising at least one closure element mounted for sliding movement across the reservoir between,
      (a) an access position in which fluid may drain into the reservoir and said at least one closure element extends outwardly of the reservoir to provide an inclined surface augmenting collection of draining cleaning fluid, and
      (b) a closed position in which the at least one closuxe element substantially covers the reservoir.

2. Apparatus according to claim 1, wherein the filter is orientated to filter fluid draining into the reservoir, under gravity, from the cleaning zone.

3. Apparatus according to claim 1, wherein the filter is supported by the reservoir and removable from the reservoir.

4. Apparatus according to claim 1, wherein the filter comprises a substantially planar filter element.

5. Apparatus according to claim 1, wherein the filter comprises a reticulated mesh element spanning the reservoir.

6. Apparatus according to claim 1, wherein the filter includes a disposable flexible filtration sheet.

7. Apparatus according to claim 1, wherein the fluid line comprises a flexible fluid line.

8. Apparatus according to claim 1, wherein the fluid line leads to a spray head positionable to spray cleaning fluid in the direction of the cleaning zone.

9. Apparatus according to claim 1, wherein the cleaning fluid delivered to the cleaning zone is recirculated through the filter, reservoir and fluid line.

10. Apparatus according to claim 1, further comprising closure means arranged to substantially close the reservoir.

11. Apparatus according to claim 10, wherein the closure means is orientated between the filter and the cleaning zone.

12. Apparatus according to claim 10, wherein the closure means comprises one or more closure elements movable from an access position in which fluid may drain into the reservoir, to a closed position substantially covering the reservoir.

13. Apparatus according to claim 12, wherein the or each closure element is arranged to slide to the closed position from the access position.

14. Apparatus according to claim 12, wherein retainer means is provided for retaining the or each closure element in the access position.

15. Apparatus according to claim 14, wherein the retainer means is arranged to release the closure element in predetermined circumstances such as elevated temperature in the reservoir.

16. Apparatus according to claim 15, wherein the retainer means is fusible.

17. Apparatus according to claim 12, wherein biasing means is provided to bias the closure element from the access position to the closed position.

18. Apparatus according to claim 12, wherein a respective closure element comprises a leaf element extending outwardly from the reservoir when orientated in the access position.

19. Apparatus according to claim 18, wherein the leaf element is at an inclined angle when extending outwardly from the reservoir.

20. Apparatus according to claim 18, wherein the extent to which a respective leaf element extends outwardly from the reservoir when orientated in the access position is adjustable.

21. Apparatus according to claim 1, further comprising mobile mounting means for mounting the reservoir on ground surface.

22. Apparatus according to claim 21, further comprising a handle for towing or pushing the apparatus.

23. Apparatus according to claim 1, wherein the reservoir comprises a shallow reservoir in which the depth of the reservoir is significantly the smallest dimension of the reservoir.

24. Apparatus for cleaning an engine or engine component, the apparatus comprising:
   (i) a reservoir for re-usable cleaning fluid;
   (ii) a filter supported over the reservoir and arranged to filter cleaning fluid draining into the reservoir;
   (iii) a cleaning fluid delivery line extending from the reservoir and arranged to deliver cleaning fluid to a cleaning zone above the filter; and
   (iv) a closure arrangement comprising at least one closure element mounted for sliding movement an access position permitting fluid to drain into the reservoir and a closed position covering the reservoir, the closure arrangement including at least one fusible retainer arranged to hold the at least one closure element in the access position and a biasing element acting to bias the at least one closure element to slide to the closed position upon fusing of the retainer.

* * * * *